US 6,711,831 B1

United States Patent
Hansen et al.

(10) Patent No.: US 6,711,831 B1
(45) Date of Patent: Mar. 30, 2004

(54) PROCESS AND AN APPARATUS FOR SPRAY DRYING

(75) Inventors: Ove Emil Hansen, Allerød (DK); Jens Mourits Sørensen, Virum (DK); Martin Andreas Grønlund Scholten, Rungsted Kyst (DK); Eric Franzen, Farum (DK)

(73) Assignee: Niro A/S, Soborg (DK)

( * ) Notice: Subject to any disclaimer, the term of this patent is extended or adjusted under 35 U.S.C. 154(b) by 0 days.

(21) Appl. No.: 09/485,731

(22) PCT Filed: Sep. 29, 1999

(86) PCT No.: PCT/DK99/00512

§ 371 (c)(1),
(2), (4) Date: Feb. 15, 2000

(87) PCT Pub. No.: WO00/74837

PCT Pub. Date: Dec. 14, 2000

(30) Foreign Application Priority Data

Jun. 8, 1999 (DK) .................... PCT/DK99/00304

(51) Int. Cl.[7] .................................... F26B 3/08
(52) U.S. Cl. .............................. 34/373; 34/372; 34/583; 34/82
(58) Field of Search .......................... 34/363, 366–375, 34/576, 582, 583, 585, 589, 82, 165, 168, 174, 175

(56) References Cited

U.S. PATENT DOCUMENTS

| 3,662,474 A | * | 5/1972 | Huthwaite ............... 34/338 |
| 3,731,393 A | * | 5/1973 | Okada et al. ............ 34/369 |
| 4,352,718 A | * | 10/1982 | Grun ...................... 203/39 |
| 4,591,324 A | * | 5/1986 | Kubota ................... 425/222 |
| 4,834,299 A | * | 5/1989 | Kishibata et al. ......... 241/5 |
| 5,149,398 A | * | 9/1992 | Shaffer et al. .......... 159/4.01 |
| 5,632,100 A | | 5/1997 | Hansen .................. 34/374 |
| 5,632,102 A | * | 5/1997 | Luy et al. ............... 34/582 |
| 5,782,010 A | * | 7/1998 | Boersen et al. .......... 34/359 |
| 5,782,011 A | * | 7/1998 | Boersen et al. .......... 34/366 |
| 6,463,675 B1 | * | 10/2002 | Hansen et al. ........... 34/373 |

FOREIGN PATENT DOCUMENTS

| GB | 2113112 A | 8/1983 | ......... F27B/15/08 |
| WO | WO 95/24599 | 9/1995 | ......... F26B/3/08 |
| WO | WO 97/14288 | 4/1997 | |

* cited by examiner

Primary Examiner—Ira S. Lazarus
Assistant Examiner—Andrea M. Ragonese
(74) Attorney, Agent, or Firm—Sughrue Mion, PLLC

(57) ABSTRACT

In a compact combined spray drying and after-treatment apparatus having internal gas filters and an internal fluidized bed in the drying chamber and a fluidized bed in the after-treatment zone, pipe means are used for conducting a stream of particle-loaded gas formed in the after-treatment zone to suitable locations in the drying chamber without disturbing the normal operation of the drying chamber and the fluidized bed therein.

14 Claims, 2 Drawing Sheets

PROCESS AND AN APPARATUS FOR SPRAY DRYING

FIELD OF THE INVENTION

The present invention relates to spray drying technology applicable within a broad range of industries, e.g. the pharmaceutical, chemical and food industries.

The term spray drying is here used in a broad sense as meaning not only processes for transforming a solid dissolved or suspended in a liquid into a powdery, possibly agglomerated material, but also processes in which an essential purpose is to agglomerate a particulate material by spraying and drying a liquid thereon.

BACKGROUND OF THE INVENTION

Within the area of spray drying substantial improvements have been developed and implemented within the last many decades. A standard textbook on spray drying technology is Masters, Keath: Spray Drying Handbook, 5th edition, (Longman Scientific & Technical 1991), incorporated herein by reference.

Modifications of the basical spray drying process which are of special relevance in connection with preferred embodiments of the present invention include the application of an internal stationary fluidized bed in the bottom portion of the spray drying chamber as well as the arrangement of a filter in the very spray drying chamber to retain particles in the chamber otherwise removed therefrom entrained in the stream of spent drying gas exhausted from the chamber.

A process and an apparatus utilizing a fluidized bed in the bottom of the spray drying chamber is described i.a. in U.S. Pat. No. 5,632,100 (Hansen). In the embodiments described in said US patent, various types of particle collecting equipment are used for treating not only the spent drying gases withdrawn from the drying chamber but also to treat particle-loaded gas streams resulting from after-treatment of the product particles recovered from the drying chamber in fluidized bed apparatuses or gravitational classifiers.

WO 97/14288 suggests incorporation of special, rigid gas filters into the very spray chamber whereby substantial advantages may be obtained, viz. improved conditions for particle agglomeration in the drying chamber and a reduction of the requirement for particle collecting equipment such as cyclones and filters, including electrostatic filters and fabric filters for treating the spent drying gases from the drying chamber.

Said WO 97/14288 discloses an embodiment in which a product recovered from a first stationary fluidized bed in the bottom of a spray drying chamber having internal, rigid gas filters is subjected to an after-treatment in an annular fluidized bed encircling said first stationary, fluidized bed and having a common ring-shaped partition wall therewith. The gas with entrained fine particles from said annular fluidized bed is introduced into the drying chamber through horizontal slits in short distance above said first fluidized layer, and subsequently passes the gas filters when leaving the chamber together with spent drying gasses, whereby said fine particles collect on the filter surfaces.

A more detailed disclosure of a spray dryer without internal filter but having a fluidized bed in the bottom of the drying chamber encirled by an annular further fluidized bed and slits for passing particle-loaded gas from the annular bed to the drying chamber, is presented in EP 749560 B1.

However, these embodiments have some drawbacks because the presence of said slits, forming almost a ring in the lowest part of the walls of the conical bottom portion of the drying chamber or just below these, interfere with the first fluidized bed by preventing the desired spouting function thereof. A spouting of material of the first fluidized bed up on the conical walls is essential to keep these free of deposited sticky material. The slits with the upward gas flow therethrough prevent proper return of the spouted material into the first fluidized bed, and involve a risk of relatively moist material dropping down into the annular fluidized bed.

Therefore, it is conventional to use one or more independent, separate apparatuses for the after-treatment.

Whether the after-treatment is a supplementary drying, a cooling, a classification, an agglomeration or a separation, a particle-loaded gas stream is formed, from which the particles must be separated to recover values therein or to avoid environmental pollution. Therefore, the particle-loaded gas stream withdrawn from the separate after-treatment apparatus is in the prior art processes passed through collection means serving solely the purpose of separating the particles from said gas stream. Also special measures had to be taken to incorporate the separated particles into the main product stream or for utilizing them in other applications.

These separate after-treatment apparatuses as well as the means for collecting the particles from the gas stream therefrom and the means for handling of the collected particles increase the total apparatus costs and also increase the space requirements.

SUMMARY OF THE INVENTION

Thus it is an object of the present invention to provide a process and an apparatus, which is simplified by omitting the collector means for collecting the particles from the gas from the after-treatment step and which can be performed in a plant being very compact since the after-treatment equipment is closely united with or built together with the fluidized bed in the bottom of the spray drying chamber, without presenting the drawbacks of the above discussed embodiment of the apparatus disclosed in WO 97/14288.

It has turned out that said drawbacks can be overcome by introducing the particle-loaded gas stream from the after-treatment into the spray drying chamber by pipe means, thereby avoiding the ring-forming slits causing problems as described above. This can be done without disturbing the primary drying gas flow and the drying and agglomeration processes in the drying chamber, and also without decreasing the quality of the resulting product.

Thus, the invention deals with a process for spray drying a liquid to produce an agglomerated product by atomizing the liquid into a drying chamber to form droplets, introducing a first stream of drying gas downward into the upper part of said chamber to partially dry the droplets, introducing a second stream of drying and fluidizing gas upward in the bottom portion of the chamber through a perforated plate to maintain a fluidized layer of particles on said plate, withdrawing a stream of spent drying gas comprising gas from said first and said second stream of gas from the chamber through particle collecting filter means thereby retaining particles on the surface of said filter means, releasing said retained particles from the filter means, to allow their contacting other particles in the chamber for agglomeration and transfer into a first fluidized layer in the chamber, from where the particles after further drying pass to a second fluidized layer intimately united to and encircling or immediately beneath said first fluidized layer for an after-treatment comprising at least one treatment selected from after-drying, cooling, classification including dust removal, agglomeration, coating and separation and withdrawing dust-loaded gas from a location above said second fluidized layer by pipe means and by said means introducing it into the drying chamber from where said gas passes through the particle-collecting filter inside the chamber before leaving the chamber together with said spent drying gas.

The spray drying process may be of the kind in which the liquid being atomized contains a dissolved or otherwise dispersed solid, which after the drying constitutes the final product.

Alternatively, the process may be characterized in that a particulate solid is injected into the chamber for agglomeration promoting contact with the atomized liquid droplets or moist particles formed by partial drying thereof, and in that solids contained in the liquid show adhesive properties when dried and/or the liquid comprises a solvent evoking stickiness of one or more components of the particulate solid.

It is a feature of the process according to the invention that the pipe means for introducing the particle-loaded gas stream into the spray drying chamber, in contrast to the prior art compact constructions provides flexibility as to the locations for the introduction. In a preferred embodiment the introduction takes place into the upper portion of the drying chamber.

The invention also deals with an apparatus for performing the above specified process, having a drying chamber, an atomizing device in said chamber connected to a source for liquid to be spray dried, a drying gas disperser in the upper portion of the chamber, a perforated plate in the bottom portion of said chamber, a plenum below said plate for providing an upward flow of fluidizing and drying gas through the perforations in said plate, sufficient for maintaining a first bed of fluidized particles on said plate, a particle-collecting filter inside said chamber, means for withdrawing a stream of gas from said chamber through said filter, a second fluidized bed intimately united to and encircling or immediately beneath said first fluidized bed, uniting means for transferring particles from the first fluidized bed existing on said plate during the operation of the apparatus, to said second fluidized bed serving as after-dryer, cooler, classifier, agglomerator, coater and/or separator for said transferred particles, which second fluidized bed during the operation thereof emits a stream of gas entraining small particles, characterized in having pipe means for introducing said stream of gas with entrained fine particles into said drying chamber at a location upstream of said filter.

In preferred versions of the apparatus, the integrated filter is located in an upper portion of the spray drying chamber.

Most experiences have been obtained using drying chambers having a lower portion of downwardly decreasing horizonal cross-section area, the bottom part of which portion accommodates the perforated plate and the fluidized layer and the filter being located above the slanted wall of said lower portion.

The amount of fine particle-loaded gas produced in the after-treatment may be large, e.g. corresponding to up to 50% of the amount of gas introduced into the drying chamber as drying and fluidizing gas. To avoid that such a large amount of gas disturbs the flow pattern existing in the chamber, which flow pattern is essential for obtaining the desired operation and product qualities, it is preferred that the pipe means connecting the after-treatment zone and the drying chamber debouches in an upper portion of the latter on a level with the filter.

In such an embodiment the filter may comprise at least one essentially vertical member of which at least a part is between the atomizer and the location in the upper portion of the chamber for debouching of said pipe means for introducing the gas stream with entrained fine particles.

In a specific embodiment of this last-mentioned version of the apparatus the filter comprises a plurality of vertical cylinders encircling the atomizer device, the pipe means for introducing the gas stream with entrained fine particles debauching at least at one location outside the one encircled by the cylinders and preferably at a distance to the nearest of said cylinders no less than 1.5 times the diameter of this cylinder.

By this arrangement it is avoided that the fine particles from the external after-treatment unit contact the hot areas in the drying chamber. This is essential since said fine particles are, due to their lower moisture content, more at risk of being heat-damaged than the average particles present in the drying chamber.

This last-mentioned embodiment furthermore has the advantage that the risk for damage of the filters due to abrasion is minimized, by avoiding impingement by very fast particles on the filter surface. Furthermore, a uniform building-up of particles on the filter surface is obtained.

The invention and subject-matter of claims not dealt with above is explained below with reference to the drawings.

DETAILED DESCRIPTION OF THE INVENTION AND PREFERRED EMBODIMENTS

Figure 1:
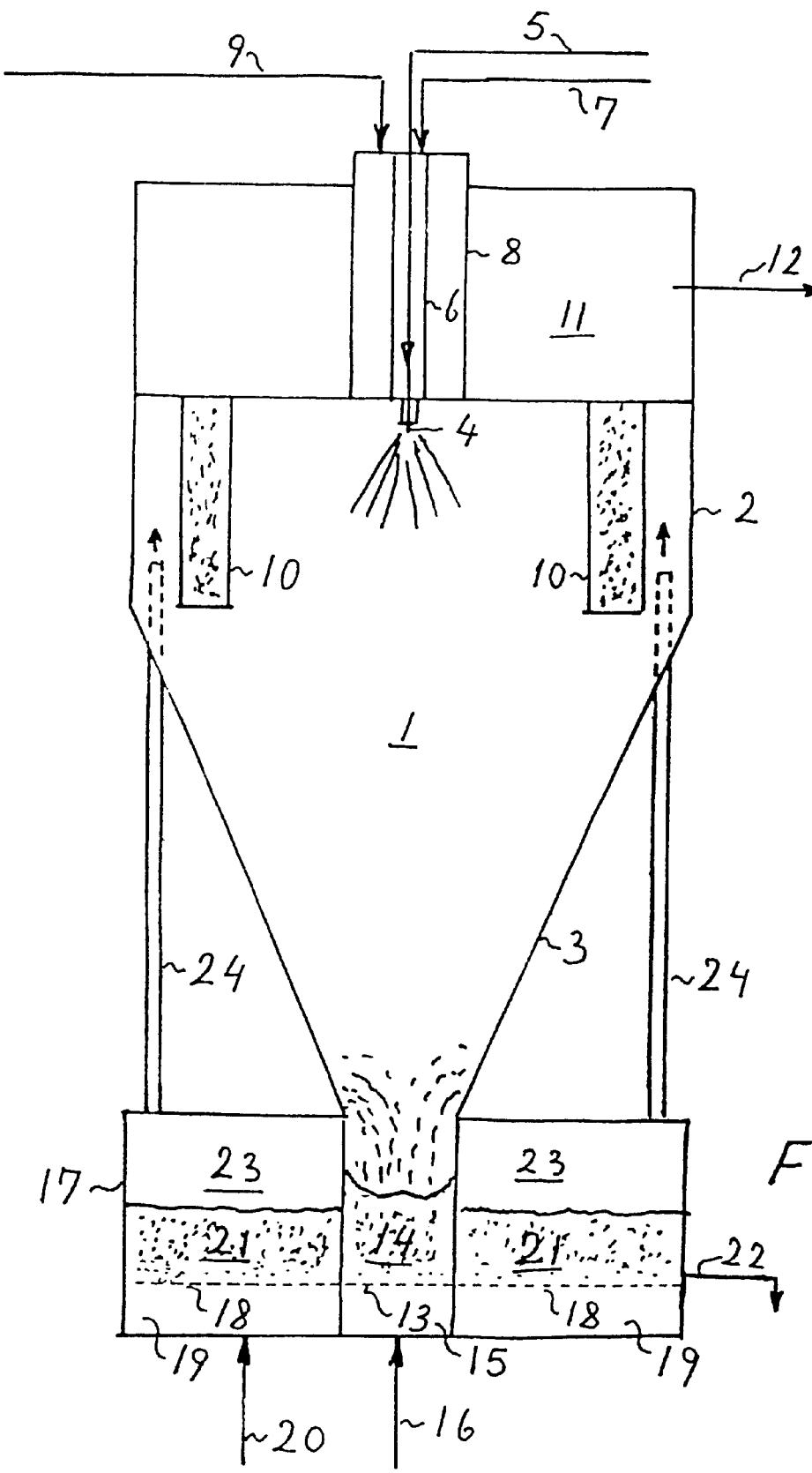
FIG. 1 is a schematical, partial, vertical section of an embodiment of an apparatus according to the invention.

The apparatus shown in FIG. 1 comprises a spray drying chamber 1 having a cylindrical upper portion 2 and a frustro-conical lower portion 3.

In the upper part of the chamber is an atomizer 4 to which liquid is fed through conduit 5. A duct 6 surrounding the atomizer serves for optional introduction of solid particles provided through 7.

Around the duct 6 is a gas disperser 8 for dispersing drying gas provided through 9 in a downward direction around the atomizer 4 and the downward opening of duct 6.

A filter 10 comprising several elements is arranged in the ceiling of the drying chamber 1 in fluid connection with a plenum 11 into which filtered gas is withdrawn from the filter elements and exhausted through duct 12.

The integrated filters may be made of a filter wall material that can be a rather soft material, such as non-woven or woven fabric of polymers, supported by a basket in the interior of the bag, or can be made from a self-supporting substantially rigid porous material, such as sintered metal or woven metal fibres or sintered ceramics.

In the bottom of the chamber 1 a perforated plate 13 supports a fluidized layer 14 of particles and agglomerates formed in the spray drying chamber 1.

Fluidization and drying gas is supplied to the fluidized layer through the plate 13 from a plenum 15 having a gas supply 16.

As an integral part of the apparatus is a housing 17 encircling the lower part of the drying chamber, accomodating the above-mentioned fluidized layer 14.

In said housing is an annular perforated plate 18 and below this a plenum 19 for fluidizing air supplied through 20.

On the plate 18 a fluidized bed 21 is maintained of particulate material supplied from the fluidized bed 14. Means for transferring particulate material from 14 to 21 is not shown in the drawing but is well-known to the person skilled in the art.

To ensure a uniform residence time of the particles in the fluid bed 21, a plug-flow pattern is preferably applied therein. This can be accomplished by passing the material one revolution through the annular bed or by having the latter partitioned in a spiral-like path in a manner known per se.

For further information as to design and operation of a spray dryer having a fluidized bed in the bottom part of the drying chamber and a further, ring-shaped fluidized bed encircling the first bed, reference is made to EP 749560 B1.

After treatment in the fluidized bed 21, the particulate material is recovered through exit 22.

From the free-board 23 above the bed 21 in the housing 17, pipe means 24 leads into the drying chamber 1.

In the embodiment depicted in FIG. 1, which embodiment might often be preferred, the pipe means 24 debouches in the upper portion of the chamber between the filters 10 and the chamber wall. Typically, said pipe means comprises several pipes debauching at evenly spaced locations.

The gas introduced through 20 and 18 collects in the free-board 23 after having served for drying, cooling or other purposes and when leaving the fluid bed 21 it has a substantial content of fine particles. Said gas passes through the pipe means 24, and after introduction into the chamber 1 the gas leaves through the filters 10 whereby a substantial amount of fine particles entrained therein collects on the filter surfaces. On the filter surfaces the particles are subjected to agglomerate-forming conditions and when the particles are released from the filters, e.g. by counterblowing, they fall down towards the slanted walls 3 of the lower portion of the drying chamber where further agglomeration takes place. From there the agglomerates fall down into the fluidized bed 14 and may be recovered after having passed the fluidized bed 21.

In contrast to the most related prior art apparatuses, the introduction of the particle-loaded gas from the fluidized bed 21 into the spray drying chamber does not in any way interfere with the flow pattern near the lowest part of the conical walls 3 where the spouting powder movement from the fluidized bed 14 is essential for the operation of the apparatus.

Figure 2:
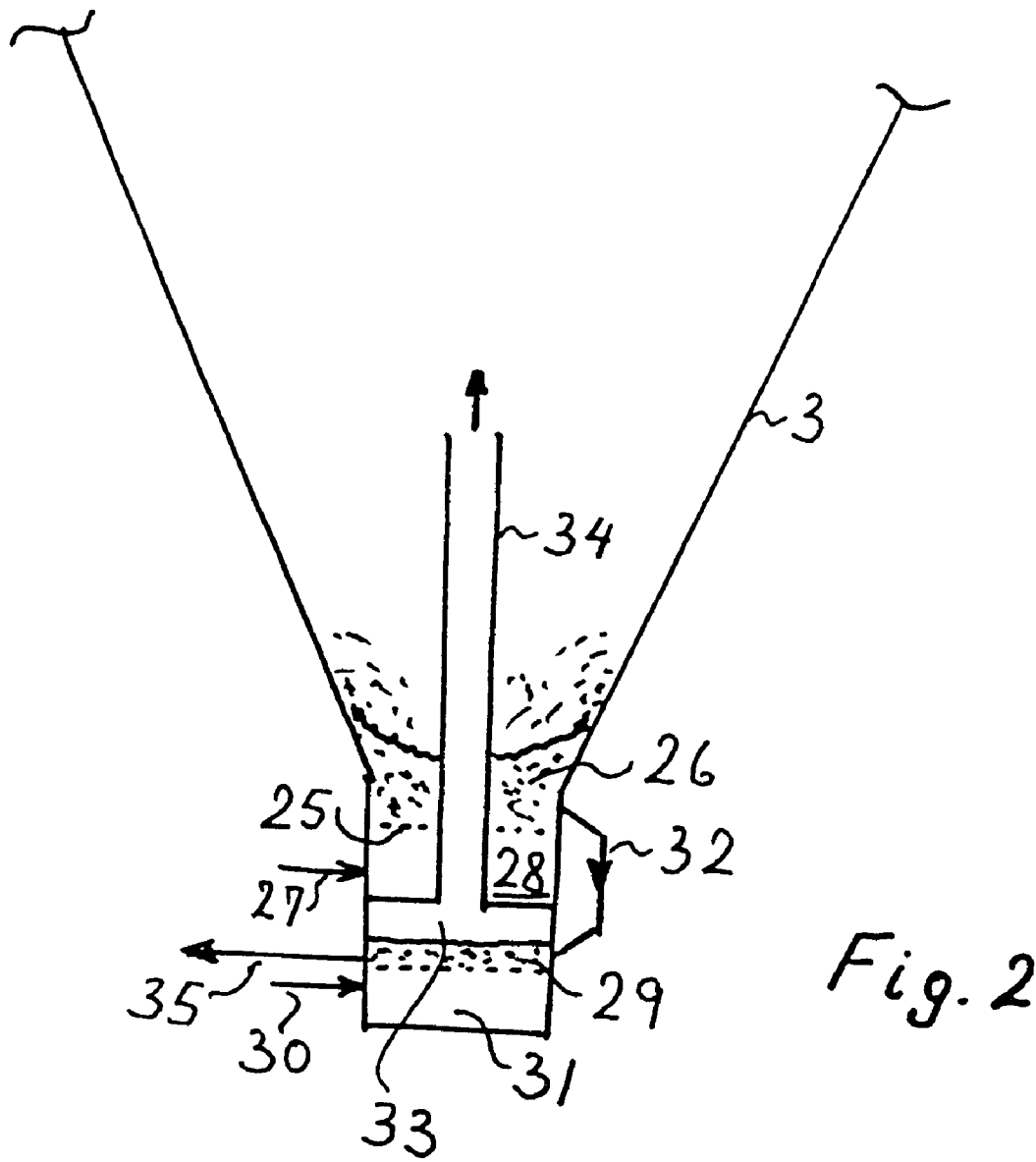
FIG. 2 is a schematical, partial, vertical section of the lower part of another embodiment of an apparatus according to the invention.

FIG. 2 shows only the lower part of an apparatus according to the invention. The upper part of the apparatus may be designed for instance with atomizer, gas disperser, particle introducer and filters as shown in FIG. 1.

In FIG. 2 the conical walls of the lower portion 3 are, as in FIG. 1, connected to a cylindrical body accomodating a perforated plate 25 supporting a fluidized bed 26 of particles falling down into said bed from the drying chamber and especially sliding down in the fluid bed along the slanted walls.

The fluidization and drying in the fluidized bed 26 takes place by means of gas introduced through 27 to a plenum 28.

Below said plenum 28 a second fluidized bed 29 is arranged. Fluidizing gas is provided from inlet 30 via a plenum 31.

Powdery material is transferred from the fluidized bed 26 to the fluidized bed 29 by means of a duct 32.

The fluidizing process taking place in the bed 29 creates a dust-loaded gas which from the space 33 above the fluidized layer is withdrawn through the pipe means 34 debauching at such distance from the surface of the fluidized layer 26 that the function of said layer, including the spouting sweeping of the lower part of the conical walls, is not influenced.

The pipe means 34 may, as alternative to the depicted embodiment, continue further up in the drying chamber, possibly up at level with the filters to minimize the influence of the gas introduced through 34 on the flow pattern existing in the drying chamber.

In the shown embodiment the fluidized bed 29 is accomodated within the same cylindric body as accomodates at least the lower part of the fluidized bed 26, but the fluidized bed 29 may alternatively be accomodated in its own housing as long as the passage from the space 33 up into the drying chamber is direct and short requiring only a minor pressure drop to enable an efficient transfer of particle-loaded gas from the space 33 to the drying chamber.

The particle flow in the fluidized bed 29 is, as in the fluidized bed 21 in FIG. 1, preferably of the plug-flow type enabling withdrawal of uniformly treated particles through exit 35.

What is claimed is:

1. A process for spray drying a liquid to produce an agglomerated product by atomizing the liquid into a drying chamber to form droplets, introducing a first stream of drying gas downward into the upper part of said chamber to partially dry the droplets, introducing a second stream of drying and fluidizing gas upward in the bottom portion of the chamber through a perforated plate to maintain a fluidized layer of particles on said plate, withdrawing a stream of spent drying gas comprising gas from said first and said second stream of gas from the chamber through particle collecting filter means thereby retaining particles on the surface of said filter means, releasing said retained particles from the filter means, to allow their contacting other particles in the chamber for agglomeration and transfer into a first fluidized layer in the chamber, from where the particles after further drying pass to a second fluidized layer intimately united to and encircling or immediately beneath said first fluidized layer for an after-treatment comprising at least one treatment selected from after-drying, cooling, classification including dust removal, agglomeration, coating and separation, and dust-loaded gas is withdrawn from a location above said second fluidized layer by pipe means and by said means introduced into the drying chamber from where said gas passes through the particle-collecting filter inside the chamber before leaving the chamber together with said spent drying gas.

2. The process of claim 1, wherein the liquid being atomized contains a dissolved or otherwise dispersed solid.

3. The process of claim 1, a particulate solid is injected into the chamber for agglomeration promoting contact with the atomized liquid droplets or moist particles formed by partial drying thereof, and in that solids contained in the liquid show adhesive properties when dried and/or the liquid comprises a solvent evoking stickiness of one or more components of the particulate solid.

4. The process of claim 1, wherein said dust-loaded gas is by said pipe means introduced into the upper portion of the drying chamber.

5. An apparatus for performing the process of claim 1 having a drying chamber (1), an atomizing device (4) in said chamber connected to a source for liquid to be spray dried, a drying gas disperser (8) in the upper portion (2) of the chamber, a perforated plate (13, 25) in the bottom portion of said chamber, a plenum (15, 28) below said plate for providing an upward flow of fluidizing and drying gas through the perforations in said plate, sufficient for maintaining a first bed (14, 26) of fluidized particles on said plate, a particle-collecting filter (10) inside said chamber, means (11, 12) for withdrawing a stream of gas from said chamber through said filter, a second fluidized bed (21, 29) intimately united to and encircling or immediately beneath said first fluidized bed (14, 26) uniting means (32) for transferring particles from the first fluidized bed (14, 26) existing on said plate during the operation of the apparatus, to said second fluidized bed (21, 29) serving as after-dryer, cooler, classifier, agglomerator, coater and/or separator for said transferred particles, which second fluidized bed during the operation thereof emits a stream of gas entraining small particles, characterized in having pipe means (24, 34) for introducing said stream of gas with entrained fine particles into said drying chamber (1) at a location upstream of said filter (10).

6. The apparatus of claim 5, characterized in that said particle collecting filter (10) is located in an upper portion of the drying chamber.

7. The apparatus of claim 5, wherein said second fluidized bed (21) encircles said first fluidized bed (14), characterized in having pipe means (24) for conducting gas leaving the fluidized bed together with fine particles to locations substantially spaced from the upper surface of the first fluidized bed.

8. The apparatus of claim 5, characterized in that said second fluidized bed (29) is arranged beneath said first fluidized bed (26) and in that said pipe means is at least one essentially vertical pipe (34) from the area (33) in the top of the second fluidized bed, through the first fluidized layer.

9. The apparatus of anyone of the claim 7, having the particle-collecting filter (10) located in an upper portion of the drying chamber, characterized in that said pipe means (24) debouches in said upper portion of the drying chamber on a level with said collecting filter.

10. The apparatus of claim 5, characterized in that the chamber (1) has a lower portion (3) having a downwardly decreasing horizontal cross-section area, the bottom part of which portion accomodates the perforated plate (13, 25) and the first fluidized layer (14, 26), the filter (10) being located in an upper portion (2) of the chamber above the slanted wall of said lower portion.

11. The apparatus of claim 10, wherein the particle-collecting filter (10) comprises an essentially vertical element, or a plurality of such, encircling the atomizing device (4) and the drying gas disperser (8), characterized in that said pipe means (24) for introducing gas with entrained fine particles into the drying chamber debouches at locations opposite to the atomizer (4) in relation to the filter (10).

12. The apparatus of claim 5, characterized in that the filter (10) comprises a plurality of vertical cylinders encircling the atomizer device (4), the pipe means (24) for introducing the gas stream with entrained fine particles debauching at least at one location outside the one encircled by the cylinders.

13. The apparatus of claim 12, characterized in that the distance from the location for debouching of the pipe means (24) to the nearest of said cylinders is no less than 1.5 times the diameter of this cylinder.

14. An apparatus according to claim 5 for performing the process of claim 3, characterized in having means (6, 7) for injecting a particulate solid into the chamber near the atomizer (4) for agglomeration promoting contact with the atomized liquid or moist particles formed by partial drying thereof.

* * * * *